United States Patent

Solowiow

[11] Patent Number: 5,866,832
[45] Date of Patent: Feb. 2, 1999

[54] ASSEMBLY FOR SIGHT READING MUSICAL SCORES AND TO ASSIST IN LEARNING AND PRACTICING A POLYPHONIC MUSICAL INSTRUMENT

[76] Inventor: Victor Solowiow, 3 rue des Boulangers, 67140 Barr, France

[21] Appl. No.: 878,112

[22] Filed: Jun. 18, 1997

[30] Foreign Application Priority Data

Jun. 18, 1996 [FR] France .................................. 96 07717

[51] Int. Cl.[6] .................................................. G09B 15/00
[52] U.S. Cl. .................................. 84/485 R; 84/485 SR
[58] Field of Search ........................... 84/485 R, 485 SR, 84/473, 471 R, 471 SR

[56] References Cited

U.S. PATENT DOCUMENTS

| | | | |
|---|---|---|---|
| 3,338,126 | 8/1967 | Wiley, Jr. et al. ..................... | 84/485 R |
| 3,668,967 | 6/1972 | Malis .................................... | 84/471 R |
| 5,386,757 | 2/1995 | Derrick ................................. | 84/473 |
| 5,524,522 | 6/1996 | Hesnan ................................. | 84/473 |

FOREIGN PATENT DOCUMENTS 0 080 400  6/1983  European Pat. Off. .

WO 84/01845  5/1984  WIPO .

*Primary Examiner*—William M. Shoop, Jr.
*Assistant Examiner*—Shih-Yung Hsieh
*Attorney, Agent, or Firm*—Young & Thompson

[57] ABSTRACT

An assembly for reading musical scores and to assist in learning and practicing a polyphonic musical instrument, as well as a process for using this assembly, comprises two flat coacting elements (1 and 2) of which the first (1) which is external and forms a flat sleeve, has on at least one of its side surfaces a series of windows ($F_i$) each associated with a pictogram ($P_i$). The second flat element (2), which is internal and in the form of a flat support, can slide with guidance in the flat sleeve forming the first element (1) and bears, distributed over its surface, a plurality of assemblies of groups of data (A, PM), the groups of data of a same assembly being disposed such that they can all appear simultaneously in the windows ($F_i$). There is a plurality of labels each bearing a predetermined association of a pictogram ($P_i$) and a group of data (A, PM), the labels being adapted to be fixed at least temporarily on the sheets of musical scores.

10 Claims, 7 Drawing Sheets

Table X 7

| Tonalities | C | C# (Db) | D | D# (Eb) | E | F | F# (Gb) | G | G# (Ab) | A | A# (Bb) | B |
|---|---|---|---|---|---|---|---|---|---|---|---|---|
| Position 1 | 5 | 6 | 7 | 8 | 9 | 10 | 11 | 12 | 1 | 2 | 3 | 4 |
| Position 2 | 10 | 11 | 12 | 1 | 2 | 3 | 4 | 5 | 6 | 7 | 8 | 9 |
| Position 3 | 1 | 2 | 3 | 4 | 5 | 6 | 7 | 8 | 9 | 10 | 11 | 12 |
| Position 4 | 8 | 9 | 10 | 11 | 12 | 1 | 2 | 3 | 4 | 5 | 6 | 7 |
| Position 5 | 3 | 4 | 5 | 6 | 7 | 8 | 9 | 10 | 11 | 12 | 1 | 2 |
| Position 6 | 9 | 10 | 11 | 12 | 1 | 2 | 3 | 4 | 5 | 6 | 7 | 8 |
| Position 7 | 8 | 9 | 10 | 11 | 12 | 1 | 2 | 3 | 4 | 5 | 6 | 7 |
| Position 8 | 12 | 1 | 2 | 3 | 4 | 5 | 6 | 7 | 8 | 9 | 10 | 11 |
| Position 9 | 1 | 2 | 3 | 4 | 5 | 6 | 7 | 8 | 9 | 10 | 11 | 12 |
| Position 10 | 2 | 3 | 4 | 5 | 6 | 7 | 8 | 9 | 10 | 11 | 12 | 1 |
| Position 11 | 5 | 6 | 7 | 8 | 9 | 10 | 11 | 12 | 1 | 2 | 3 | 4 |

FIG. 6

ASSEMBLY FOR SIGHT READING MUSICAL SCORES AND TO ASSIST IN LEARNING AND PRACTICING A POLYPHONIC MUSICAL INSTRUMENT

SUMMARY OF THE INVENTION

The present invention relates to the field of practicing music, more particularly learning a polyphonic instrument and sight reading and the preparation of scores and their production, and has for its object an assembly aiding in sight reading of musical scores and learning or practicing a polyphonic instrument, as well as a process for sight reading, preparation and annotation of a musical score using this assembly.

There are already known different devices, particularly in the form of a printed support sliding in a windowed sleeve, permitting sight reading notes of a musical score, indicating the decay of chords into elementary notes and/or showing the different possible harmonics of a given base note.

However, these known devices, of the type of those described in French 2,485,236 and U.S. Pat. No. 3,791,254, are limited to musical theory and to supplying abstract musical information and do not permit obtaining information usable directly for practicing a specific polyphonic instrument.

The known devices also do not indicate the different possibilities of producing a given chord on the instrument in question, so as to select the easiest to execute.

Finally, these devices require the application of handwritten annotations on the musical scores, which can require relatively delicate work and an irremediable deterioration of the sheets of the musical scores.

Moreover, the handwritten inscriptions or annotations can often not be read other than by the writer of them.

The present invention has particularly for its object to overcome the mentioned drawbacks.

To this end, it has for its object an assembly for sight reading musical scores and to assist in learning and practicing a polyphonic musical instrument, characterized in that it is principally constituted, on the one hand, by two flat coacting elements, of which the first, external and in the form of a flat sleeve, has on at least one of its lateral surfaces a series of associated windows, each with a pictogram representing at least schematically the local contact points of the fingers of the player on the portion of the control members of the instrument in question for playing a given note or chord and of which the second, internal and in the form of a flat support, can slide with guidance in the flat sleeve forming the first element and carries, about its surface, a plurality of insignia of groups of data each comprised by a chord or a note and, as the case may be, of a corresponding positioning of the hand of the player on the instrument, the groups of data of a same assembly being disposed such that they all appear simultaneously within the windows of the flat sleeve when the two flat coacting elements are located in a suitable relative position with respect to each other and, on the other hand, by a plurality of labels each bearing a predetermined combination of a pictogram and a group of data forming a part of the possible associations of a pictogram of the first element and of a group of data of the second element, generated during relative sliding of the two flat coacting elements, said labels being adapted to be fixed at least temporarily on the musical score sheets or the like.

BRIEF DESCRIPTION OF THE DRAWINGS

The invention will be better understood from the following description, which relates to a preferred embodiment, given by way of non-limiting example, and explained with reference to the accompanying schematic drawings, in which:

FIG. 6 is a flat elevational view of a support carrying a reference table associated with a pack of sheets for support elements.

DESCRIPTION OF THE PREFERRED EMBODIMENTS

Figure 1:
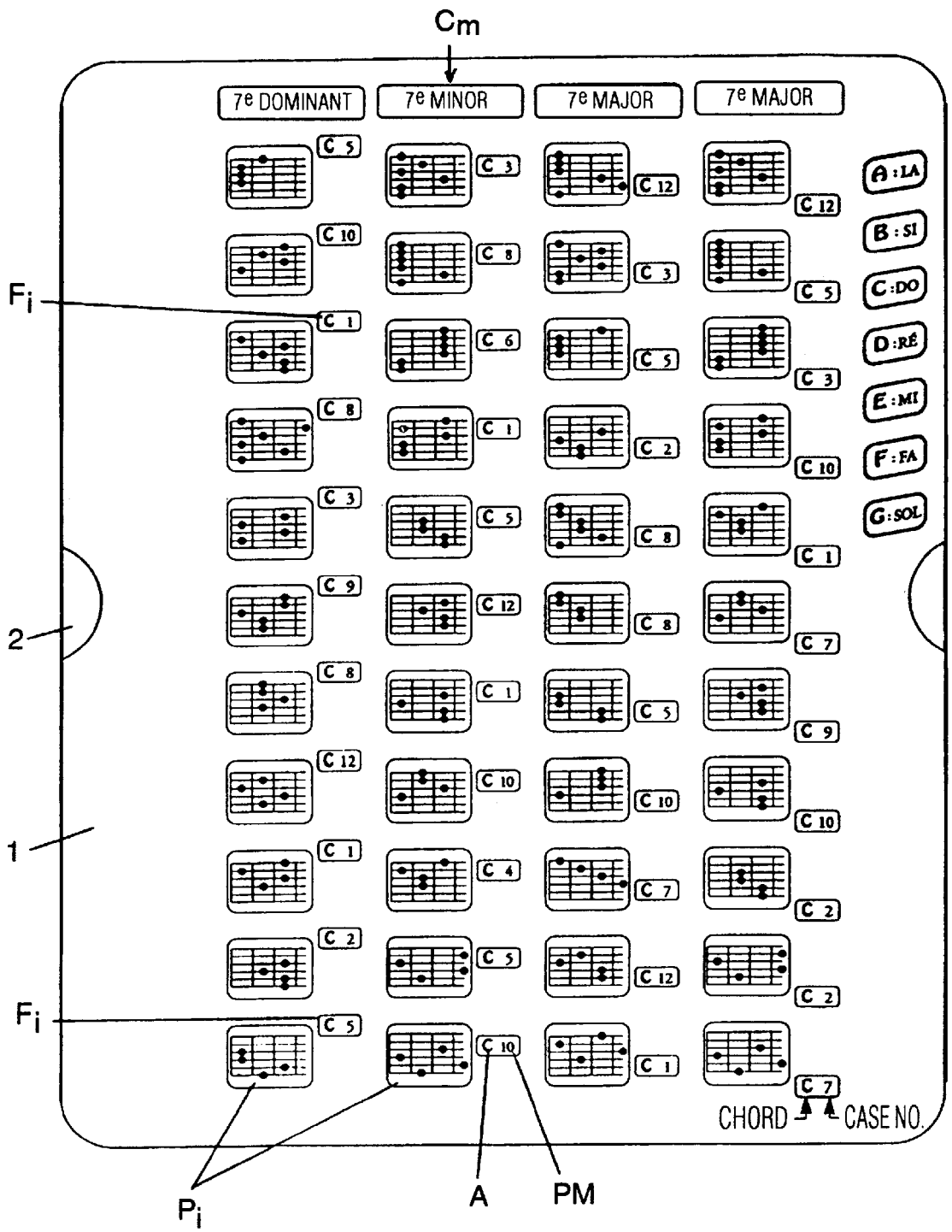
FIG. 1 is an elevational plan view of the two flat coacting elements forming a portion of the assembly according to the invention.

According to the invention, and as shown in FIGS. 1–7 of the accompanying drawings, the assembly which aids in sight reading and the preparation of a score and in learning and practicing a polyphonic instrument, is essentially constituted, on the one hand, by two flat coacting elements 1 and 2, of which the first, 1, which is external and in the form of a flat sleeve has, on at least one of its surfaces a series of windows $F_i$ each associated with a pictogram $P_i$ representing at least schematically the local contact points of the player on one or a portion of the control members of the instrument in question for producing a note or a given chord, and of which the second 2, which is internal and in the form of a flat support, can slide with guidance in the flat sleeve forming the first element 1 and carries, distributed over its surface, a plurality of assemblies of groups of data A, PM each comprised by a chord or a note A and, as the case may be, a positioning PM corresponding to the hand of the player on the instrument, the groups of data A, PM of a same assembly being disposed such that they appear entirely simultaneously within the windows $F_i$ of the flat sleeve 1 when the two coacting flat elements 1 and 2 are located in a relatively fixed position relative to each other, and, on the other hand, by a plurality of labels 3 each having a predetermined association with a pictogram $P_i$ and of a group of data A, PM forming a part of the possible associations of a pictogram $P_i$ of the first element 1 and a group of data A, PM of the second element 2, generated during relative sliding of the two flat coacting elements 1 and 2, said labels 3 being adapted to be fixed at least temporarily on the sheets 4 of musical scores or the like.

Figure 2:
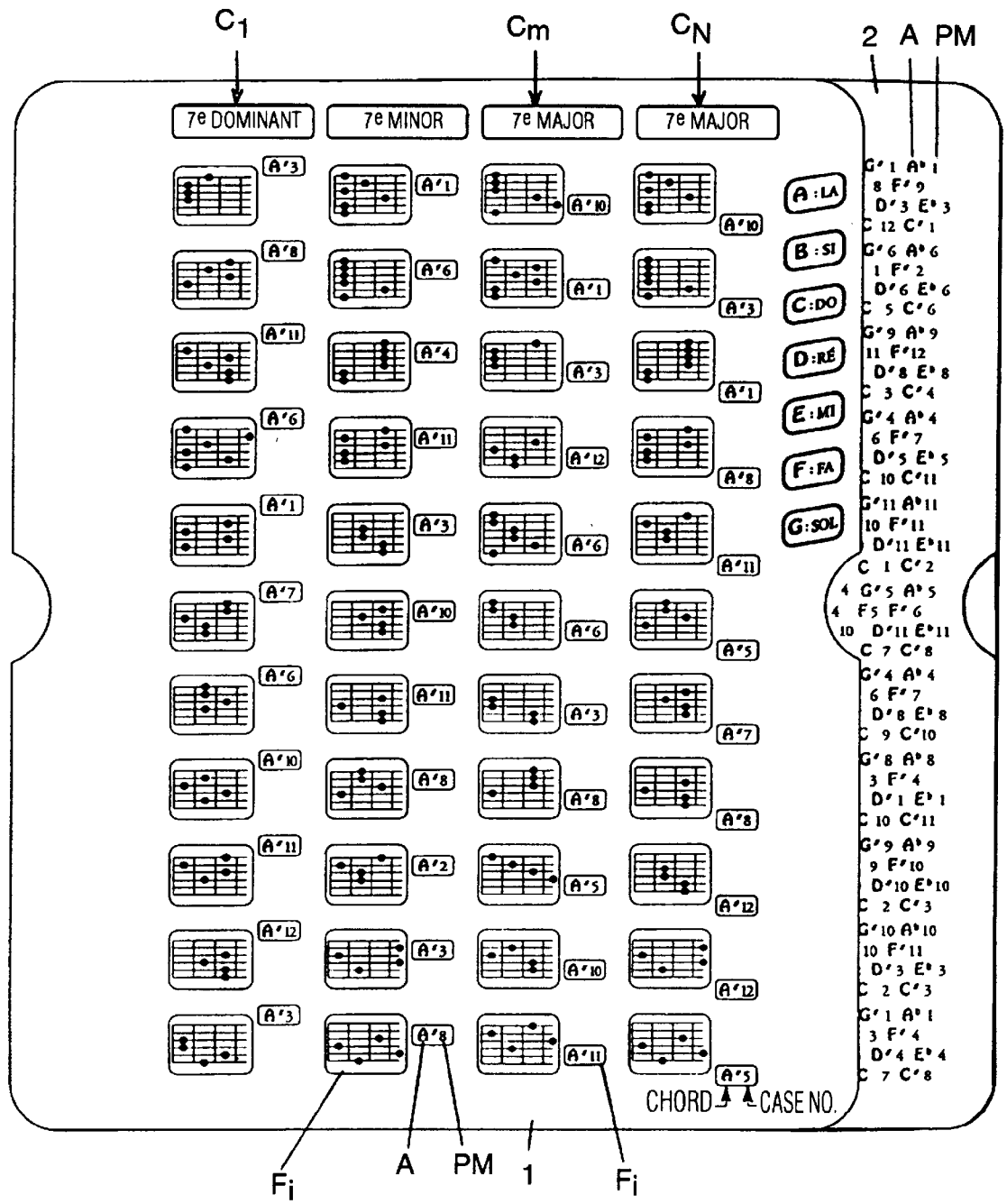
FIG. 2 is an elevational view in a plane identical to that of FIG. 1 after a controlled sliding of the second element internally relative to the first external element.
Figure 4:
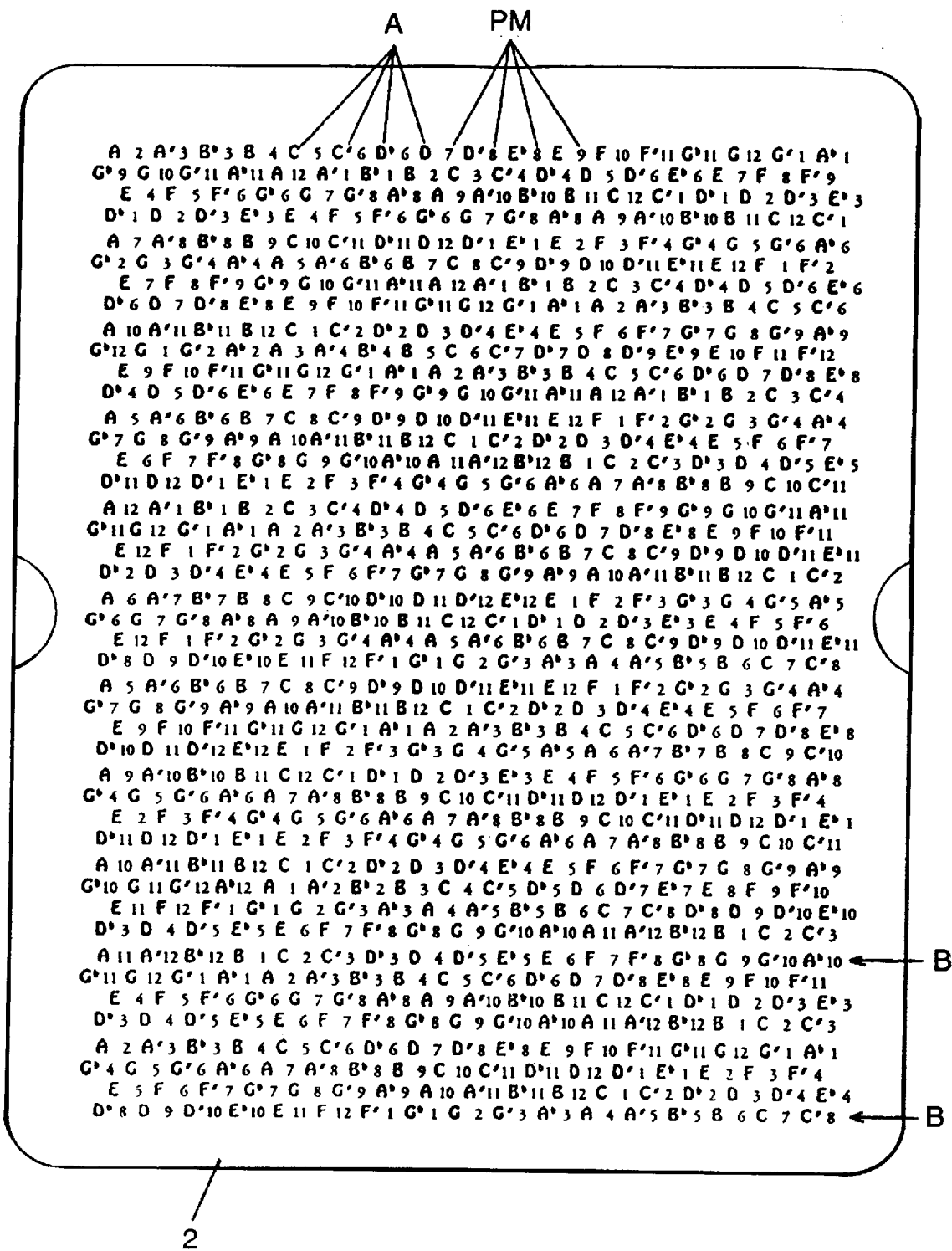
FIG. 4 is an elevational view of the printed support forming the second element.

As FIGS. 1 and 2 of the accompanying drawings show, in connection with FIG. 4 of the accompanying drawings, each assembly of data groups A, PM corresponds to a musical note or to a given single chord A, whose tonality is altered or not.

Thus, FIG. 1 shows a relative positioning of the first and second elements 1 and 2 leading to a simultaneous display of the assembly of the data groups A, PM corresponding to the note DO, at the level of the windows $F_i$, whilst FIG. 2 shows a relative positioning leading to the display of the assembly of the data groups A, PM corresponding to the note LA sharp.

In the case of application to a guitar, the data PM should consist of a number, indicating the number of the fret on the throat of the guitar where the right hand should be positioned to play the note or chord in question.

The combination of these data PM with a pictogram $P_i$ representing schematically the frets and the contact points for the fingers (the six horizontal lines representing the six chords of the guitar), thus indicate the absolute position and the configuration of the fingers to play a given chord or note.

Each datum A corresponds either to a note or to an unbroken or pure chord, either sharped or flatted.

Figure 3:
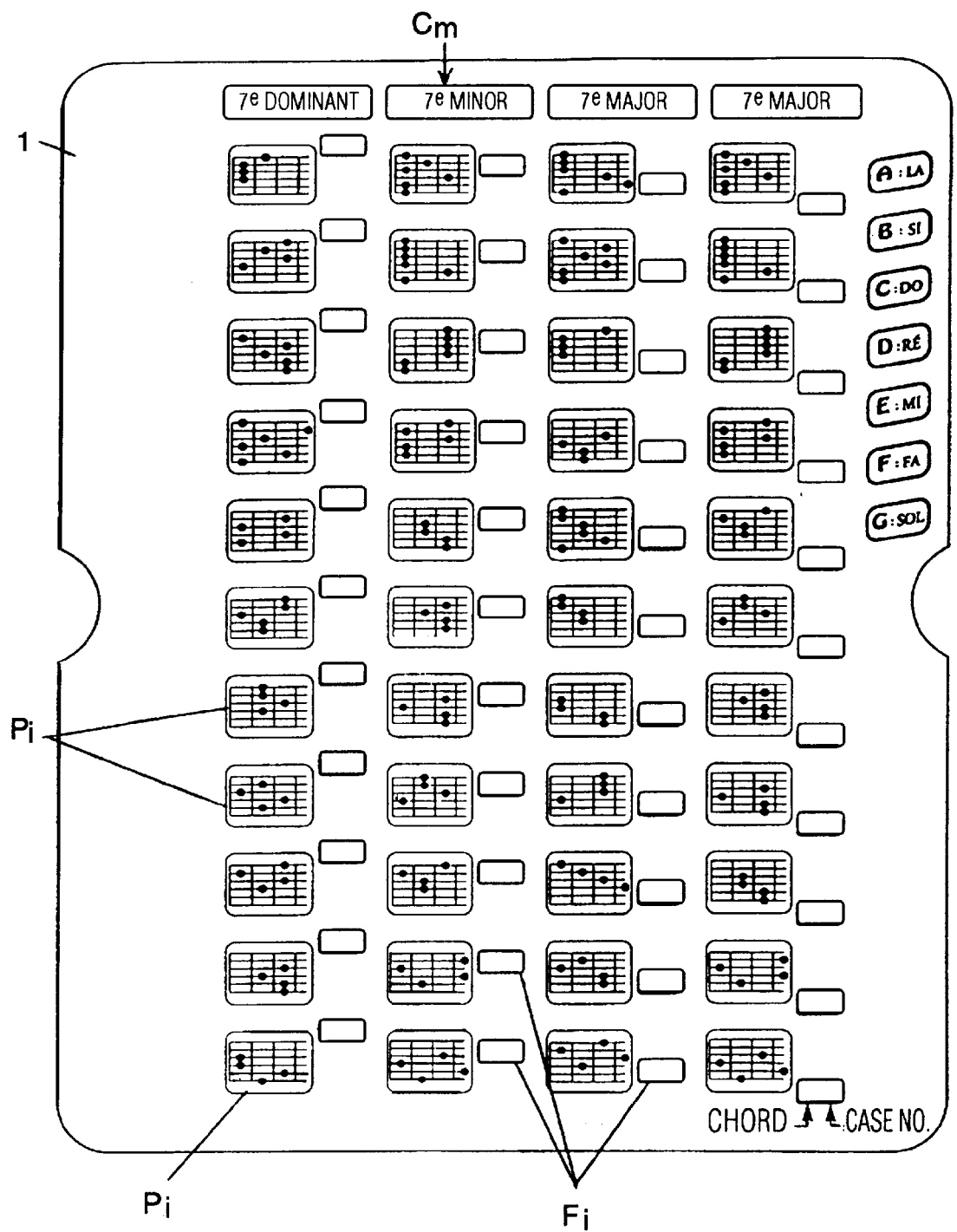
FIG. 3 is an elevational view of the sleeve forming the first element.

According to one characteristic of the invention, shown particularly in FIGS. 1, 2 and 3 of the accompanying drawings, the pictograms $P_i$ carried by the flat sleeve 1 and their associated windows $F_i$ are disposed in column $C_n$ extending perpendicular to the direction of sliding of the internal flat support 2, each column $C_n$ corresponding to a specific tonic/mode couple.

According to a preferred embodiment of the invention, the flat sleeve 1 comprises N parallel columns $C_n$ of windows $F_i$ and of pictograms $P_i$, each constituted by a number I of windows $F_i$ and of pictograms $P_i$, the upper edge of the opening of the window $F_i$ of the column $C_{n+1}$ being located slightly below or at most coinciding with the lower edge of the opening of the window $F_i$ of the column $C_n$, with $1 \leq i \leq I$ and $1 \leq n \leq N-1$, and the upper edge of the opening of the window $F_i$ of column $C_1$ being located slightly below or at most coinciding with the lower edge of the window $F_{i-1}$ of column $C_n$, with $2 \leq i \leq I$. Preferably, the area of the opening of each window $F_i$ is just sufficient to contain and display a single group of data A, PM.

Thus, in the course of sliding of the internal element 2 within the external element 1, each window $F_i$ moves along a particular longitudinal strip B of the internal support 2, this window being the only one permitting reading the groups of data A, PM printed on said strip B, groupwise during sliding.

As a result, the groups of data A, PM carried by the internal element 2 are arranged in strips or lines B parallel to the sliding direction of said internal element 2, each line or strip of data comprising, in a manner ordered and coordinated with the other strips or lines, all the groups of data A, PM which can be formed given the pictogram $P_i$ associated with the window $F_i$ in question and of the column $C_n$ to which this latter belongs.

As a result of the mentioned arrangement, there is the possibility of having a very great density of groups of data A, PM on the internal support 2 (FIG. 4).

Figure 5:
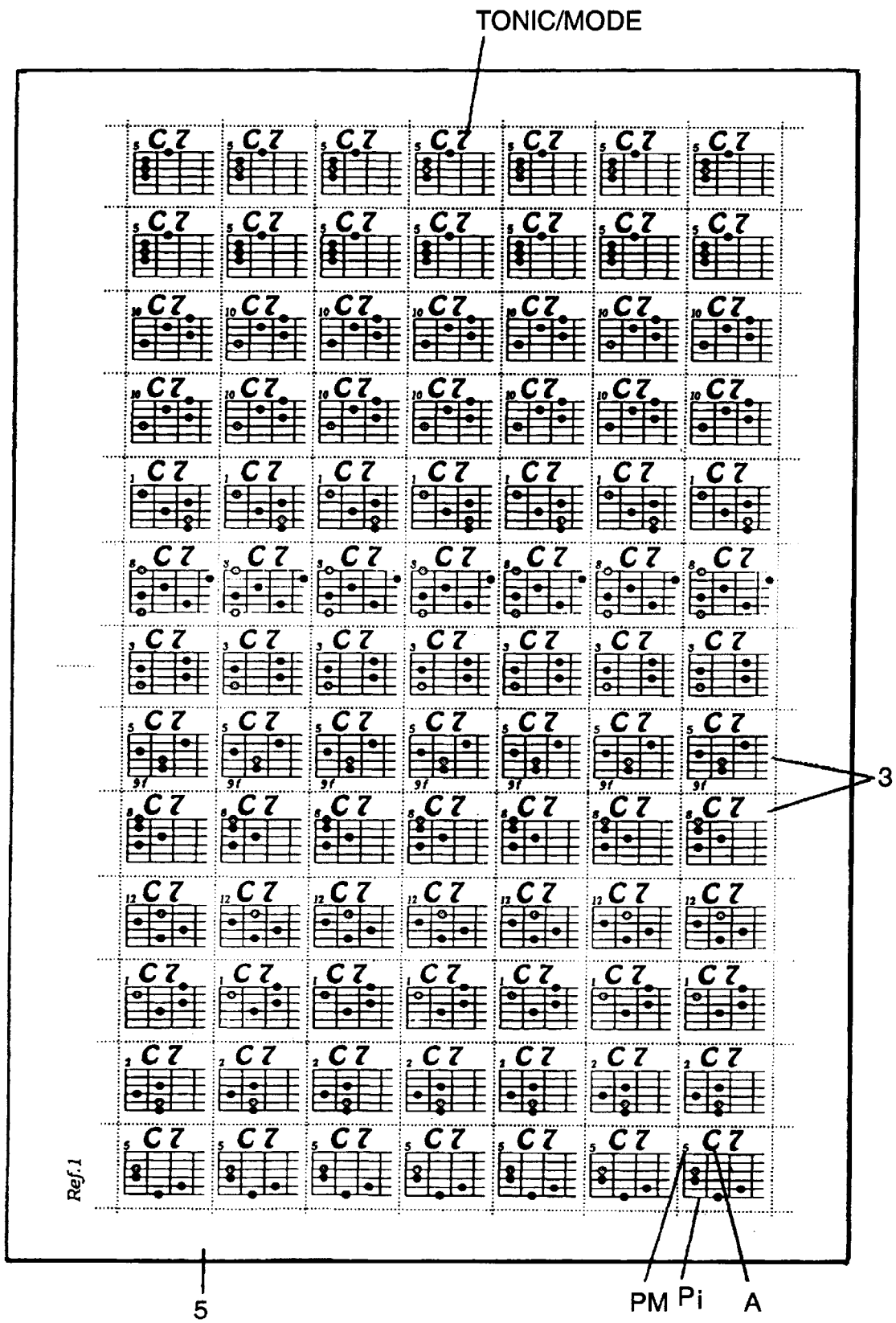
FIG. 5 is a flat elevational view of a sheet supporting labels according to the invention.

As shown in FIG. 5 of the accompanying drawings, the labels 3, of which each is present in several copies, are arranged by note or chord A, on the sheets of the analogous supports 5 assembled in a retainer, particularly of the binder type.

So as to facilitate the search for the labels 3 in the collector, the sheets 5 carrying the labels 3 are grouped in packets, each packet corresponding to a specific tonic/mode couple and enclosing the sheets 5 corresponding to the chords or notes A, broken or not, to be played according to a given tonic/mode couple in question.

So as to effect quickly a selection of the labels 3 as a function of the different possibilities for positioning of the hand for a given combination (pictogram $P_i$/a chord or note A/tonic/mode couple), it can preferably be provided that each packet of sheets 5 will be associated with an index table with two inputs, permitting determining the position PM of the hand of the player on the musical instrument as a function of the positions of local contact of the fingers of the hand of the player, such as determined by the pictograms $P_i$, and of the note or chord A to be played, each label 3 bearing moreover information relative to the position of the hand PM (FIG. 6).

Moreover, labels 3 of a same sheet 5 could also be arranged as a function of the data PM relative to the position of the hand.

According to a first modified embodiment of the invention, the labels 3 have a cold-self-sticking back, permitting repeated securement and removal, and the support sheets 5 are covered with an anti-adhesive layer, such as for example a layer of paraffin or silicone.

According to a second modification of the invention, the labels 3 could comprise magnetic securement means, which can coact with complementary magnetic securement means on the support sheets 5 and the score or the like sheets 4, these means being present in the form of a surface film, an integral layer or particles embedded in the fibrous mass.

The labels 3 could for example be of paper including magnetized magnetic iron filings, the score sheets 4 consisting of paper incorporating non-magnetized iron filings.

Figure 7:
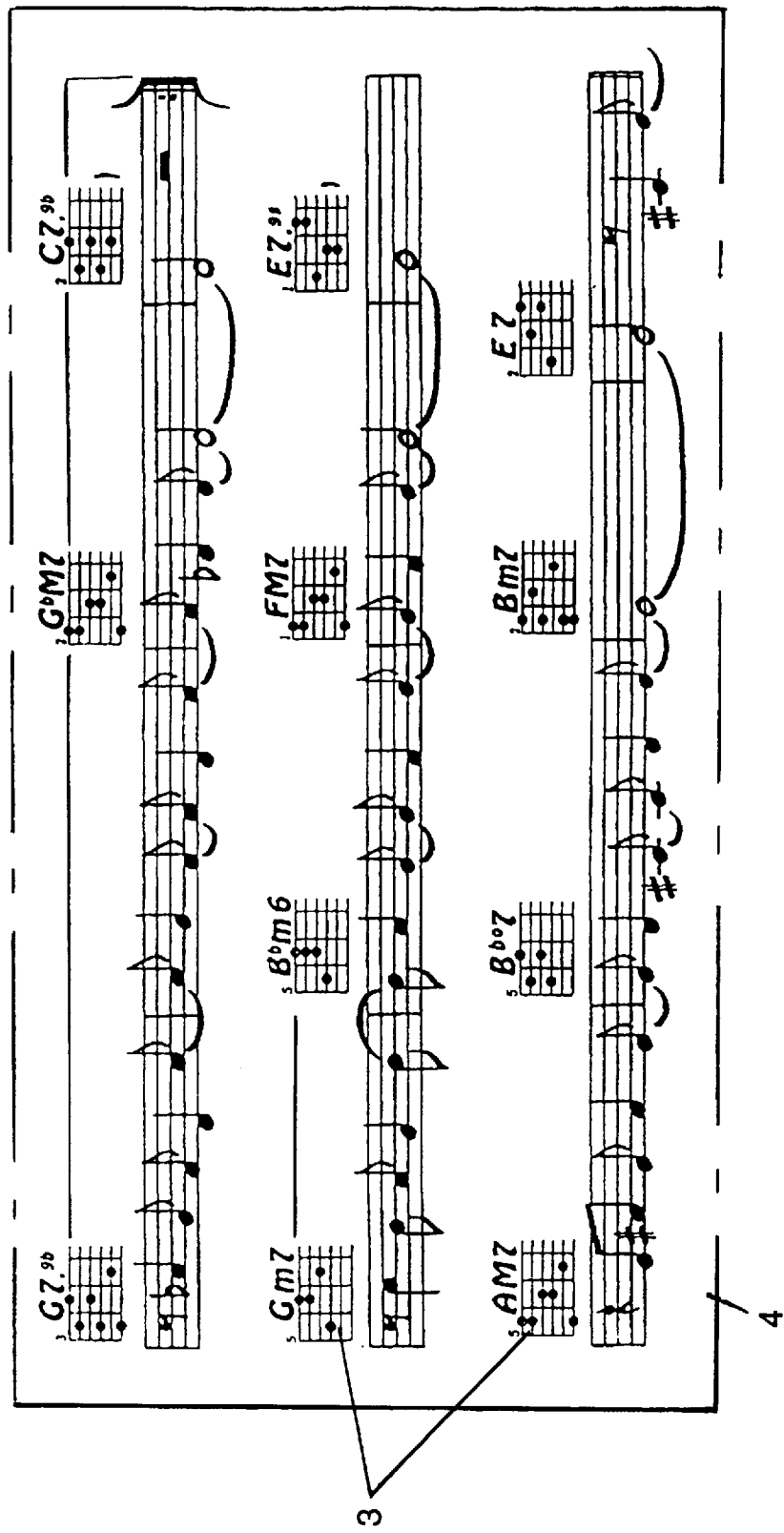
FIG. 7 shows three score lines provided with labels according to the invention.

FIG. 7 shows by way of example a portion of a page of a score on which the labels 3 according to the invention have been applied.

The invention also has for its object a process of sight reading, of preparation and annotation of a musical score, using the assembly described above, characterized in that it consists in reading and in identifying a chord or note A, as well as the corresponding tonic and mode parameters, on the score 4 in question, in effectuating a controlled sliding of the flat internal element 2 within the external sleeve 3 until the chord or note A in question, or a corresponding reference symbol, is visible in the windows $F_i$ of the sleeve 1, referencing the column $C_n$ corresponding to the tonic/mode couple mentioned on the score 4 for the chord or note A in question, choosing in this column the pictogram $P_i$ for the position of the fingers and the indication PM of the position of the hand leading to the easiest manipulation to be effected, particularly as a function of the chord or the note to be played which precedes and the positions of the fingers of the hand selected for this purpose and indicated on the label 3 applied to the score 4 at the level of said preceding note or chord, searching within the content collector and applying to the score, adjacent the chord or note A to be read, the label 3 bearing the pictogram $P_i$ and the indication PM of the position of the hand selected and corresponding to said chord or said note A, associated with the indicated tonic or mode, and repeating the preceding operations until all of the score 4 is read and annotated or labelled.

Although the present invention and the accompanying drawings show more particularly an application of the instrument to a stringed and throated instrument, of the guitar type, it is easy for those in the art to apply it without particular effort to any polyphonic musical instrument.

Of course, the invention is not limited to the embodiment described and shown in the accompanying drawings. Modifications remain possible, particularly as to the construction of the various elements or by substitution of technical equivalents, without thereby departing from the scope of protection of the invention.

What is claimed is:

1. An assembly for sight reading scores and for helping to learn and practice a polyphonic musical instrument, comprising two flat coacting elements (1, 2) of which a first element (1) is external and forms a flat sleeve and has on at least one of its sides a series of windows ($F_i$) each identified by a pictogram ($P_i$) representing at least schematically the positions for contact by the fingers of a player on a portion of a said musical instrument to produce a given note or chord, and of which a second element (2) is internal to the first element and is in the form of a flat support slidable within the flat sleeve forming the first element (1) and has, distributed over a surface of said second element (2), a plurality of assemblies of groups of data (A, PM) each comprised by a chord or a note (A) and a corresponding position (PM) of the hand of the player on the instrument, the groups of data (A, PM) of a same assembly being disposed such that they appear simultaneously in the windows ($F_i$) of the flat sleeve (1) when the two elements (1, 2) are in one position relative to each other, and a plurality of labels (3) each bearing a predetermined combination of a said pictogram ($P_i$) and a said group of data (A, PM) comprising one possible combination of a said pictogram ($P_i$) of said first element (1) and a group of said data (A, PM) of said second element (2) generated during relative sliding of the two elements (1,2).

2. Assembly according to claim 1, wherein each assembly of groups of data (A, PM) corresponds to a single given musical note or chord (A).

3. Assembly according to claim 1, wherein said pictograms ($P_i$) carried by said flat sleeve (1) and the associated said windows ($F_i$) are disposed in columns ($C_n$) extending perpendicular to a direction of sliding of the internal element (2) relative to the external element (1), each said column ($C_n$) corresponding to a specific tonic/modal couple.

4. Assembly according to claim 3, wherein the flat sleeve comprises N parallel columns ($C_n$) of said windows ($F_i$) and of said pictograms ($P_i$), each said column being constituted by a number (I) of said windows ($F_i$) and of said pictograms ($P_i$), an upper edge of a window ($F_i$) of a said column ($C_{n+1}$) being located slightly below or in alignment with the lower edge of an opening of a window ($F_i$) of an adjacent column ($C_n$), wherein $1 \leq i \leq I$ and $1 \leq n \leq N-1$, and wherein an upper edge of a said window ($F_i$) of a said column ($C_1$) is located slightly below or in alignment with a lower edge of the window ($F_{i-1}$) of another said column ($C_n$), wherein $2 \leq i \leq I$ and wherein the area of opening of each window ($F_i$) is just sufficient to contain and display a group of data (A, PM).

5. Assembly according to claim 1, wherein said labels (3) are assembled by note or chord (A) on sheets of supports (5) assembled in a collector.

6. Assembly according to claim 5, wherein the sheets (5) bearing the labels (3) are arranged in packets, each packet corresponding to a specific tonic/modal couple and enclosing the sheets (5) corresponding to the chord or notes (A) to be played according to predetermined tonic/modal data couple.

7. Assembly according to claim 6, wherein each packet of sheets (5) is associated with an index table with two inputs, permitting determining the position (PM) of the hand of the player on the musical instrument as a function of the positions of local application of the fingers of the hand of the player, as shown by said pictograms ($P_i$), and of the note or chord (A) to be played, each label (3) carrying information as to the position of the hand (PM).

8. Assembly according to claim 1, wherein the labels (3) have a cold-self-sticking rear face, permitting repeated securement and detachment and wherein the support sheets (5) are covered with a non-adhesive layer.

9. Assembly according to claim 1, wherein the labels (3) comprise magnetic securement means adapted to coact with complementary magnetic securement means on the support sheets (5) and the sheets of the score (4), the last-named means being present in the form of a surface film or an integrated layer or particles embedded in a fibrous mass.

10. Process for reading, preparing and annotating a musical score, using the assembly of claim 1, which comprises steps of: reading and identifying a chord or note (A), as well as corresponding tonic and modal parameters, from a musical score (4), effecting controlled sliding of the flat internal element (2) within the external sleeve (1) until the chord or note (A) or a corresponding reference symbol is visible in the window ($F_i$) of the sleeve (1), noting the column ($C_n$) corresponding to the said tonic/modal couple on the score (4) for the said chord or note (A), choosing in this column the pictograms ($P_i$) for position of the fingers and the indication (PM) for the position of the hand leading to the easiest manipulation to be carried out, as a function of the chord or note to be played which precedes and the positions of the fingers of the hand selected to this end and indicated on the label (3) applied to the score (4) adjacent said preceding chord or note, locating in a collector for the leaves of the score and applying to the score, adjacent the chord or note (A) to be read, the label (3) bearing the pictograms ($P_i$) and the indication (PM) of the selected position of the hand and corresponding to said chord or said note (A) associated with the indicated tonic or mode, and repeating these operations until the assembly of the leaves of the score (4) is read and annotated or labelled.

* * * * *